United States Patent [19]
Ishikawa et al.

[11] Patent Number: 5,987,226
[45] Date of Patent: Nov. 16, 1999

[54] PRINTING SYSTEM AND METHOD

[75] Inventors: Hiroshi Ishikawa; Koji Adachi; Koushi Kawamoto, all of Nakai-machi, Japan

[73] Assignee: Fuji Xerox Co., Ltd., Tokyo, Japan

[21] Appl. No.: 08/827,364

[22] Filed: Mar. 27, 1997

[30] Foreign Application Priority Data

Mar. 28, 1996 [JP] Japan .................................. 8-073554

[51] Int. Cl.⁶ .................................................. G06F 15/00
[52] U.S. Cl. ............................................. 395/112; 395/114
[58] Field of Search ..................................... 395/112, 114, 395/116, 101, 133, 145, 147, 162–166; 364/518, 521, 131; 370/85.12

[56] References Cited

U.S. PATENT DOCUMENTS

| | | | |
|---|---|---|---|
| 4,949,280 | 8/1990 | Littlefield | 364/518 |
| 4,951,280 | 8/1990 | McCool et al. | 370/85.12 |
| 5,287,194 | 2/1994 | Lobiondo | 395/114 |
| 5,333,246 | 7/1994 | Nagasaka | 395/133 |

FOREIGN PATENT DOCUMENTS

| | | | |
|---|---|---|---|
| 1-188374 | 7/1989 | Japan | B41J 5/30 |
| 5-12228 | 1/1993 | Japan | G06F 15/16 |
| 5-108582 | 4/1993 | Japan | G06F 15/16 |
| 6-12392 | 1/1994 | Japan | G06F 15/16 |
| 6-168087 | 6/1994 | Japan | G06F 3/12 |
| 91/15831 | 10/1991 | WIPO | G06F 15/72 |

*Primary Examiner*—Jose L. Couso
*Assistant Examiner*—Duy M. Dang
*Attorney, Agent, or Firm*—Oliff & Berridge, PLC

[57] ABSTRACT

To divide and transfer a printing job so that the printing job can be efficiently rasterized by plural processors and improve the processing rate of the whole system in a printing system in which plural processors are roughly connected via a network, the following means are provided: Processing resource information extracting means extracts resource information required every divided job. If a processor is not provided with a required resource, it instructs a processor provided with the resource to transfer it using resource transfer means and receives the resource. Prior information means informs a processor and others of required processing prior to transfer. As the processor and others execute required processing based upon the contents of prior information, they can immediately start processing when a file is transferred.

21 Claims, 18 Drawing Sheets

| DIRECTORY LIST | DIRECTORY CONTENTS |
| --- | --- |
| PROCESSOR SPECIFYING INFORMATION | xxx.yyy.zzz.001,WORKER1 |
| ENABLED/DISABLED | YES |
| PROCESSOR | ULTRASPARC,4 |
| COMMUNICATION PROTOCOL | TCP/IP,XTP,XNS |
| NETWORK PHYSICAL LAYER | ATM622,HIPPI |
| IMAGING | PS LEVEL2,HTML,QD3D |
| SUPPORT FORMAT | CCITT,IMF, |
| AVAILABLE MAIN STORAGE CAPACITY | 32MB |
| AVAILABLE AUXILIARY STORAGE CAPACITY | 256MB |
| FONT RESOURCES | RL,GB,MB,HB,HM |
| EXTERNAL CHARACTER RESOURCES | LOGO A, CATALOGUE B |
| OTHER RESOURCES | ACCEL DLUT,ACCEL FILTER |
| EXTERNAL ACCESS CLASS | 2 |
| OPERATING SYSTEM | UNIX |
| WINDOW | X |

FIG. 4

PRINTER REGISTRATION INFORMATION

| PRINTER ADDRESS | INSTALLED LOCATION | RESOLU- TION | DATA FORMAT | COLOR REPRES- ENTATION | SINGLE/ DOUBLE SIDES | FORM | OUTPUT SIZE | SCANNING DIRECTION | POST PROCES- SING | SUPPORT PROCES- SING | STATUS | SYNCHRO- NIZATION CONTROL |
|---|---|---|---|---|---|---|---|---|---|---|---|---|
| xxx.yyy.zzz.008 | A-9F-12 | 400 | 8BIT | YMCK RGB | 1 | COATED PAPER,ART PAPER | A5,A4,A3,B4 | LEF A3SEF | 1 | RET COLOR CORRECTION | 1 | 1 (ADDRESS) |
| xxx.yyy.zzz.015 | C-2F-03 | 600 | 8BIT | YMCK | 1 | OHP, PLAIN PAPER | A5,A4,A3,B4 | LEF A3SEF | 2 | FILTER | 2 | 0 |
| xxx.yyy.zzz.084 | X-1F-13 | 1200 | 1BIT | YMCK | 0 | FILM KENT PAPER | A4,A3,A2 | LEF A2SEF | 0 | COMPRES- SION/EXPAN- SION | 0 | 0 |
| xxx.yyy.zzz.124 | F-5F-32 | 800 | 16BIT | LAB, YMCK | 1 | CARDBOARD POSTCARD | A5,A4,A3,B4 | LEF A3SEF | 1 | RET COLOR CORRECTION | 1 | 1 |

RANGE OF VALUE
RESOLUTION: xxx/25.4 mm
DATA FORMAT: DEPTH BITS OF DATA
COLOR REPRESENTATION: COLOR SPACE TRANSFERRED TO PRINTER
SINGLE/DOUBLE SIDES: SUPPORTED PRINTING FACE(S)
OUTPUT SIZE: OUTPUT FORM SIZE
SCANNING DIRECTION: LASER BEAM SCANNING DIRECTION
POSTPROCESSING: 0:NONE, 1:SORTING, 2:BOUND BY STAPLER, 3:BOUND, 4:BAGGING, -1:OUT OF ORDER
SUPPORT PROCESSING: PROCESSING FUNCTION PROVIDED INSIDE IOT
STATUS: 0:POWERED OFF, 1:ON STANDBY, 2:BEING OUTPUT, -1:OUT OF ORDER
SYNCHRONIZATION CONTROL: 0:NONE, 1:SYNCHRONIZED,SYNCHRONIZED DESTINATION ADDRESS IF SYNCHRONIZED

FIG. 6

FRAGMENT TRANSFER TABLE

IDENTIFIER: 0000 1001h
JOB IDENTIFIER: 0100 0002h
SCHEDULING CONTROL: SEQUENTIAL
PROCESSING PRIORITY: A CLASS

| FRAGMENT | FILE ADDRESS | WORKER ADDRESS | REQUIRED RESOURCE | INFORMED RESOURCE | FILE CONTENTS | SIZE | DIVISION SUPPORT | TRANSFER ORDER |
|---|---|---|---|---|---|---|---|---|
| 0000 1001h | 0124 | 5512 | 03 | F01 | Cha | 50 | Y | 1 |
| 0000 1002h | 0196 | 5698 | 02 | R04 | Ras | 8,000 | Y | 4 |
| 0000 1003h | 1125 | 5998 | 01 | Pos | Lin | 300 | N | 2 |

FRAGMENT TAG

IDENTIFIER: 0000 1001h
TABLE IDENTIFIER: 0100 0002h
ESTIMATED PROCESSING TIME: 13200 UNIT

ESTIMATED REQUIRED STORAGE
CAPACITY: 2700 KBYTE

SYNCHRONIZED DESTINATION
JOB IDENTIFIER: −1

ALLOCATED DESTINATION: xxx.yyy.zzz.008
LAYOUT: (0,280),(345,0)
PAGE NUMBER: 12
REQUIRED RESOURCE
REQUIRED FONT: xxx
REQUIRED SOFTWARE: yyy
REQUIRED PARAMETER: zzz

CONFIRMATION MODE: 1
DEVICE CHARACTERISTICS: 3

FIG. 18

PRINTING SYSTEM AND METHOD

BACKGROUND OF THE INVENTION

1. Field of the Invention

The present invention relates to a printing system for processing and printing print information described in a page description language and others and to a method of performing same.

2. Description of the Related Art

On a client computer, text entry software, plotting software, image editing software and other software are run and a document can be widely composed. A document is described in the internal format of each software and the internal format is converted to a format suitable for printing when the document is printed. For a description format, PostScript (PS), Interpress, GDI, QuickDraw (any is a trademark or a registered trademark) and others can be given as an example. The language specifications of PostScript which is a typical example are published as PostScript Reference Manual by Adobe Systems. The language specifications of Interpress are published as Interpress The Source Book by Xerox (in the United States). The basic description of the language and the processing process are described in the second chapter, "The Programming Language" of The Source Book. Interpress is a stack-type language in which an operand is pushed into a stack, and when an operator part is executed, its operand is removed from a stack and is replaced with the result. Such operation of an operator has a more important property as a process for generating a page image efficiently than as a process for returning a result particularly in an imaging operator. Software for executing this task is roughly classified into two categories. One is an interpreter for interpreting a language and the other is an imager for generating a visible image in a memory. The respective specifications are different, however, PostScript is also basically similar and the language and the execution are described in detail in the second and third chapters of PostScript Reference Manual. For example, on the 40th page, it is described that "PostScript has no concept of reading a program prior to the execution and instead every time PostScript interpreter reads one grammatical entity, it executes the entity." This is the characteristic of an interpreter for sequentially executing a program.

That is, in a conventional type page description language processing printer, sequential interpretation is executed by the central processing unit (CPU) of the printer and printing is executed by the body of the printer. An example in which a memory for receiving and storing a program for printing transmitted from a computer (hereinafter called a printing job), a processor for sequentially interpreting the printing job and a printer for printing according to the interpreted printing job are provided, and after the printing job is transmitted from the computer to the printer, the printer translates the printing job and prints to reduce the load of the computer and to enhance the processing rate of the whole system is described in Japanese Published Unexamined Patent Application No. Hei 1-188374. However, it is known that if conversion from a page description language to a print picture element (hereinafter called rasterization) is realized by software, a large quantity of processing time is required. Further, it is feared that more and more loads will be imposed on a processor in the future to meet the recent requirements of higher quality and coloring.

Some techniques are proposed to process a printing job at higher speed and for a conventional type example related to the present invention, a printing system in which plural processors are roughly connected by a network and a printing job is interpreted in parallel by distribution in a network is disclosed in Japanese Published Unexamined Patent Applications No. Hei 3-507018 and No. Hei 6-168087.

However, a printing system disclosed in Japanese Published Unexamined Patent Application No. Hei 3-507018 is constituted so that after a client process for dividing a printing job into plural processors and instructing parallel rasterization or a print configuration server for controlling synchronization of the division of a printing job and parallel rasterization with plural processors collects print picture elements and synthesizes them in an image memory, the synthesized print picture elements are transferred to a printer for executing printing. That is, in the above printing system, a large quantity of rasterized print picture element information is transferred at least twice via a network. Therefore, in the printing system disclosed in the Japanese Published Unexamined Patent Application No. Hei 3-507018, network traffic is increased, and it takes much time to output a print and the effect of parallel rasterization by plural processors cannot be obtained sufficiently.

In the meantime, a printing system disclosed in Japanese Published Unexamined Patent Application No. Hei 6-168087 is constituted so that a management object (or a manager) for managing parallel rasterization by plural processors instructs a print object in each processor to print using each CPU and the print object controls a printer when it receives a print message and sends rasterized print picture element information to the printer. Further, the division on a page of a divided, rasterized and collected printing job is not considered and it is premised that division is in units of page. Therefore, the effect of distributed processing described in the Japanese Published Unexamined Patent Application No. Hei 6-168087 greatly depends upon the number of pages included in a printing job and it is clear that if the number of pages included in a printing job is small, the effect of distributed processing cannot be obtained sufficiently.

In Japanese Published Unexamined Patent Application No. Hei 6-12392, a scheduler allocates processing to a computer in order by allocating to a computer the total amount processed, which is small, from a large quantity of processing in order and updating the total amount. In the case of general calculation, the result is regardless of the computer that used. However, in the case of a printing job, there are computer which can process a particular printing job and computers which cannot process it, and therefore, a printing job cannot be scheduled based upon simply totalized amount of processing. A printing job is required to be synchronized in units of page. However, in the above patent application, if a distributed job in units of page cannot be successively collected even if processing is uniformly finished in a printing job consisting of plural pages, printing cannot be started until the whole distributed job is collected and the effect of distribution in printing cannot be obtained. In the case of the above patent application, each computer has similar functions and resources such as the utilization factor of CPU, the stability of CPU, the limit of time in which CPU is utilized and CPU rate are managed. However, as apparatuses for executing processing for printing are not provided with the same function, but rather processors are provided with different characteristics, and further a collector and a printer are required, and a printer the total amount of processing of which is small and to which a job is not allocated is selected by a user, inconvenience occurs in usual use. As a printing job is divided in units of page, it is difficult to estimate the amount of a job simply based upon the total amount of processing. As a printing job is sequentially processed, is output on paper and the location is defined differently from a general computer job, information to understand the progress of the whole job is also essential to distributed processing, however, heretofore, no such control means of a printing job existed.

When processing is executed via a network, a print file is created by various applications and in addition, many types of files are created. If a divided file is a raster file apropriate for printing such as a photograph, it is difficult to divide a printing job as it is and as the size of a file consisting of raster data is very large, time required for processing a raster file and time required for transferring it become bottlenecks.

SUMMARY OF THE INVENTION

The present invention is made in consideration of the above situation and the object is to provide a printing system in which plural processors are roughly connected by a network, each data is transferred to plural processors so that it is efficiently rasterized by the plural processors and the processing rate of the whole system is improved.

According to the present invention, to achieve the above object, a printing system for executing rasterization for obtaining picture element information for printing based upon a source file in which a printing job is described by plural processors roughly connected via a network is provided with means for extracting the resource information of the above processors to execute the above printing job, means for dividing the above printing job, means for connecting the transfer source and the transfer destination of the above divided printing job, prior information means for informing the above transfer destination of preparatory processing prior to the transfer of the above divided printing job to execute the preparatory processing of the divided printing job in the transfer source and transfer scheduling means for determining the transfer schedule of the above divided printing job.

According to this constitution, when the divided printing job is transferred to each processor, the fact is informed to each processor beforehand and time to make required preparations is provided. Therefore, when the divided printing job is actually transferred, each processor can immediately start processing. As resources required at each transfer destination are known when a printing job is divided and transferred, these are transferred and the printing job can be processed by more processors in parallel.

In this constitution, means for transferring resources required for rasterization of the above divided printing job to each processor to which the divided printing job is allocated may be also provided to the above printing system.

The above required resources are an external character, a processing software module and a specific parameter required for processing for example.

The above prior information means may inform at least one of a printer for executing the above printing job and a collector for collecting the above rasterized information of preparatory processing.

The above transfer scheduling means may be provided with confirmation mode setting means for instructing to return the above collected printing job to each processor to which the printing job is issued. In addition, the collector for collecting the above rasterized information may be provided with means for generating information for display based upon the above instructed printing job and for returning it to the processor to which the printing job is issued.

The above transfer scheduling means may select at least one of plural transfer modes including a sequential mode for transferring from the part of the divided printing job according to the priority of the above printing job, a page mode for transferring in units of page from a page on which division is finished, a batch mode for transferring the above printing job in units of printing job in a batch and a time mode for transferring with time specified and may transfer the part of the printing job in the selected transfer mode.

When the printing job to be rasterized meets a predetermined condition, it may be rasterized in a processor in which the above printing job is generated.

In this case, if the size of a generated raster image is judged to be larger than a fixed size, the above raster image may be rasterized by rasterization means determined beforehand so that it is the form and the size of the final output image and afterward, may be also divided.

According to the present invention, to achieve the above object, a printing method for executing rasterization for obtaining picture element information for printing based upon a source file in which a printing job is described by plural processors roughly connected via a network, includes the step of extracting the resource information of the above processors to execute the above printing job, dividing the above printing job, connecting the transfer source and the transfer destination of the above divided printing job, informing the above transfer destination of preparatory processing prior to the transfer of the above transfer information to execute the preparatory processing of the divided print information in the transfer source and determining the transfer schedule of the above divided printing job.

When the divided printing job is also transferred to each processor in this constitution, the fact is informed beforehand and time for making required preparations is provided. Therefore, when the divided printing job is actually transferred, each processor can immediately start processing. As resources required at a transfer destination are already known when a printing job is divided and transferred, the printing job can be processed by more processors in parallel.

The outline of the present invention will be described based upon an example. First, a printing job is divided. If a processor has no required resource because required resource information is provided for every divided job by processing resource information extracting means for the divided job, the processor instructs a processor which has the resource to transfer it using resource transfer means and the resource is transferred to the processor. Therefore, a normal processor can process even processing which uses a special resource, and an unused processor can be efficiently utilized and division processing is widely enabled. If a resource is transferred or even if a resource is already provided, environment in which it is operated by a processor is required to be formed. As when a processor receives the contents informed by the prior information means, a required processing function is known and required processing is executed based upon the prior informed contents, processing can be started at the time in which a file is transferred. The technique is particularly effective in processing which requires time to start. The location in which a divided job is held and a processor for processing (a transfer destination) are determined by transfer source/ destination connecting means and the divided job is transferred to each processor. As this connecting means is operated after resource transfer means is operated if a processor is provided with no required resource, a divided job can be uniformly allocated.

The control of a flow if a divided job is allocated is required, however, transfer is smoothly realized in any of: (1) a sequential mode in which division processing is advanced by transfer scheduling control and every time a divided file is generated, it is transferred, (2) a page mode in which when division is finished in units of page, a divided file is transferred, (3) a batch mode in which when the whole job is divided, it is transferred and (4) a time division mode in which when it is fixed time, transfer is started.

When processing is judged to be efficiently advanced if a divided file is rasterized before it is transferred in case the divided file is transferred, it is rasterized by division support means before transfer. Even if a raster image is larger than a fixed size, a raster image that is difficult to divide can be also rasterized by being processed so that it is the final output image and divided by time sharing support means.

When printing instruction means instructs a confirmation mode in division or when the transfer scheduling control means instructs a confirmation mode, a printing job is divided and operated, a file in a confirmation mode is generated. As the collected file in the confirmation mode is returned to a client processor instructed by transfer scheduling control means, the client processor can confirm the job before printing.

BRIEF DESCRIPTION OF THE DRAWINGS

FIG. 4 explains processor registration information in the above embodiment;

FIG. 6 shows an example of printer registration information in the above embodiment;

FIG. 18 explains a fragment tag and a fragment transfer table in the above embodiment.

DESCRIPTION OF THE PREFERRED EMBODIMENTS

An embodiment according to the present invention will be described below.

Figure 1:
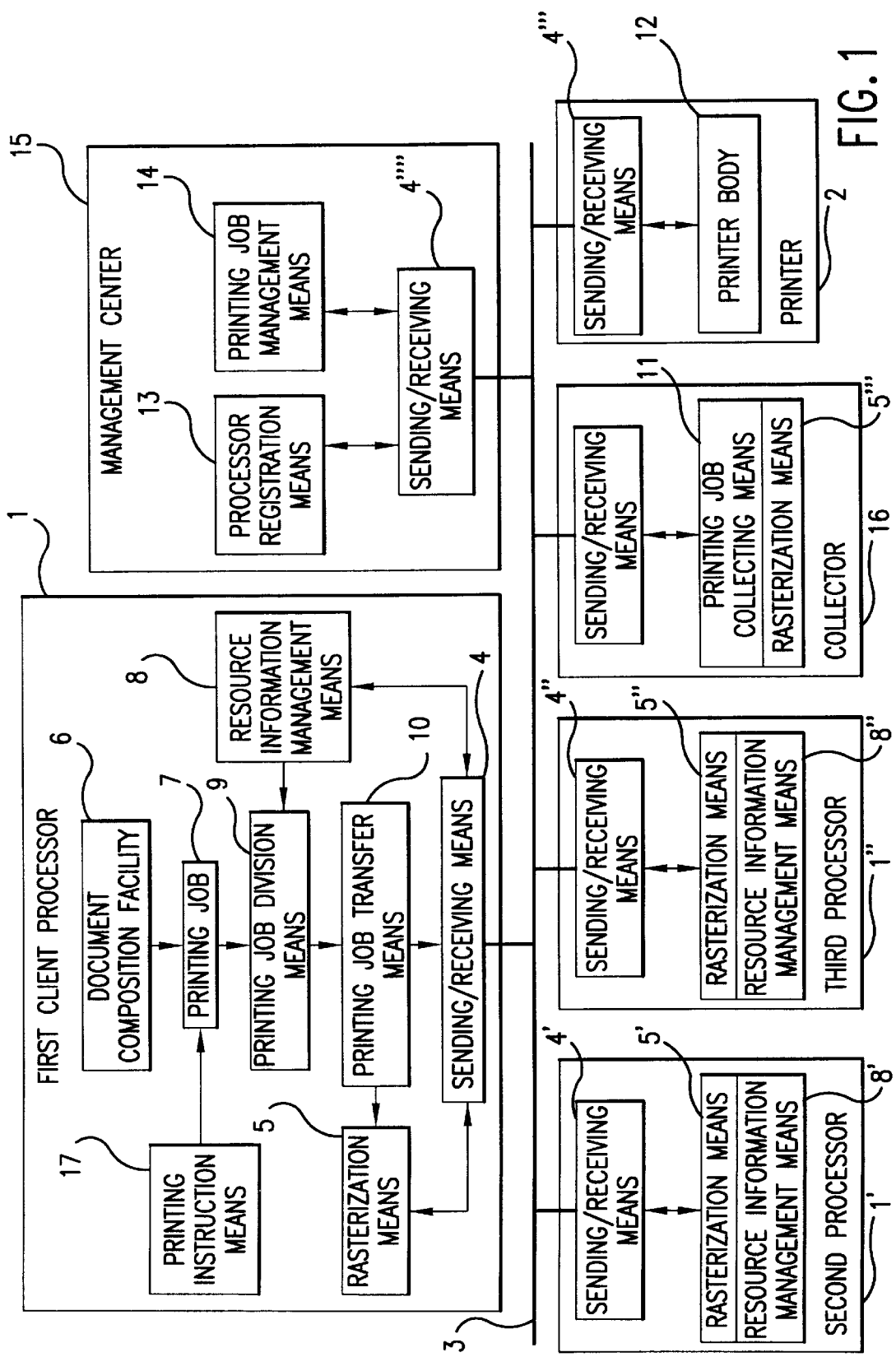
FIG. 1 is a block diagram showing an embodiment according to the present invention.

FIG. 1 shows the constitution of a printing system equivalent to this embodiment. As shown in FIG. 1, the printing system is provided with a group of processors shown by 1, 1' and 1", a printer 2 connected to this group of processors 1 via a network 3, a management center 15 and a collector 16. The group of processors 1 including 1' and 1" (hereinafter the same) and the collector 16 consist of personal computers or workstations respectively connected to the network 3. The management center 15 for managing the printing system is also connected to the network 3. The network 3 may be a wired network represented by Ethernet and ATM and may be also a wireless network represented by a communication satellite. The network may be not only a local area network but a wide area network via a public line.

At least one processor in the group of processors 1 is provided with a document composition facility 6 and a user creates a document to be printed using this processor 1. This processor 1 is called a client processor to differentiate it from the others. The created document is converted into a printing job 7. The contents of a job are described by various types of languages. PostScript, QuickDraw, GDI and others can be given as an example. QuickDraw includes QuickDraw GX in which a function such as a transparency is expanded, QuickDraw 3D in which depth information is represented by a vector and a graphic form can be represented from various angles and others (they are trademarks or registered trademarks).

A user instructs a desired method of processing a job in the constitution described above via printing instruction means 17. According to this, a printing job is sent to printing job division means 9. The printing job is divided by printing job division means 9 based upon resource information held by resource information management means 8 and the divided result is sent to printing job transfer means 10 for transferring it to each processor. The divided result is processed by each processor 1, the result is collected by the printing job collection means 11 of the collector 16 and transferred to the printer 2. It is printed by the body 12 of the printer 2.

In FIG. 1, only one client processor is shown, however, plural client processors may be provided, plural document composition facilities 6 may be linked via a network and hereby, one printing job may be completed by plural processors including plural client processors. The above plural client processors are respectively provided with printing job division means 9, printing job transfer means 10, sending/receiving means 4 and others. No inconsistency occurs if only the printing job management means 14 of the management center 15 recognizes that the printing job is a single one and issues a tag even if a printing job is completed by plural processors including plural client processors.

Next, the details of the embodiment will be described with the printing job transfer means 10 in the center.

Figure 3:
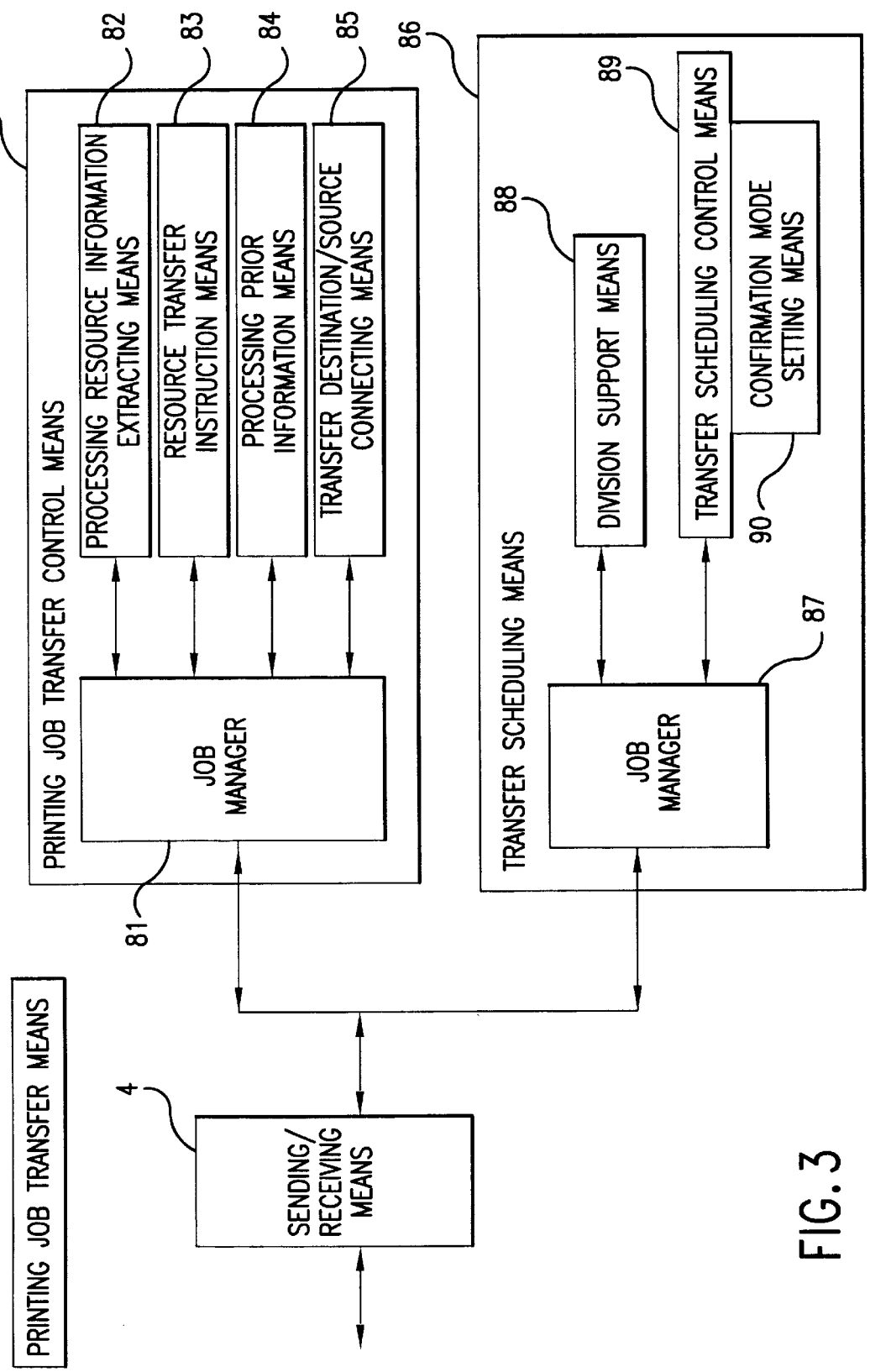
FIG. 3 is a block diagram showing an example of the constitution of printing job transfer means 10 in the above embodiment.

FIG. 3 shows the constitution of the printing job transfer means 10. As shown in FIG. 3, the printing job transfer means 10 consists of printing job transfer control means 80 and transfer scheduling means 86. The printing job transfer control means 80 is constituted by a job manager 81, processing resource information extracting means 82, resource transfer instruction means 83, processing prior information means 84 and transfer destination/source connecting means 85, and the transfer scheduling means 86 is constituted by a job manager 87, division support means 88, transfer scheduling control means 89 and confirmation mode setting means 90.

Figure 7:
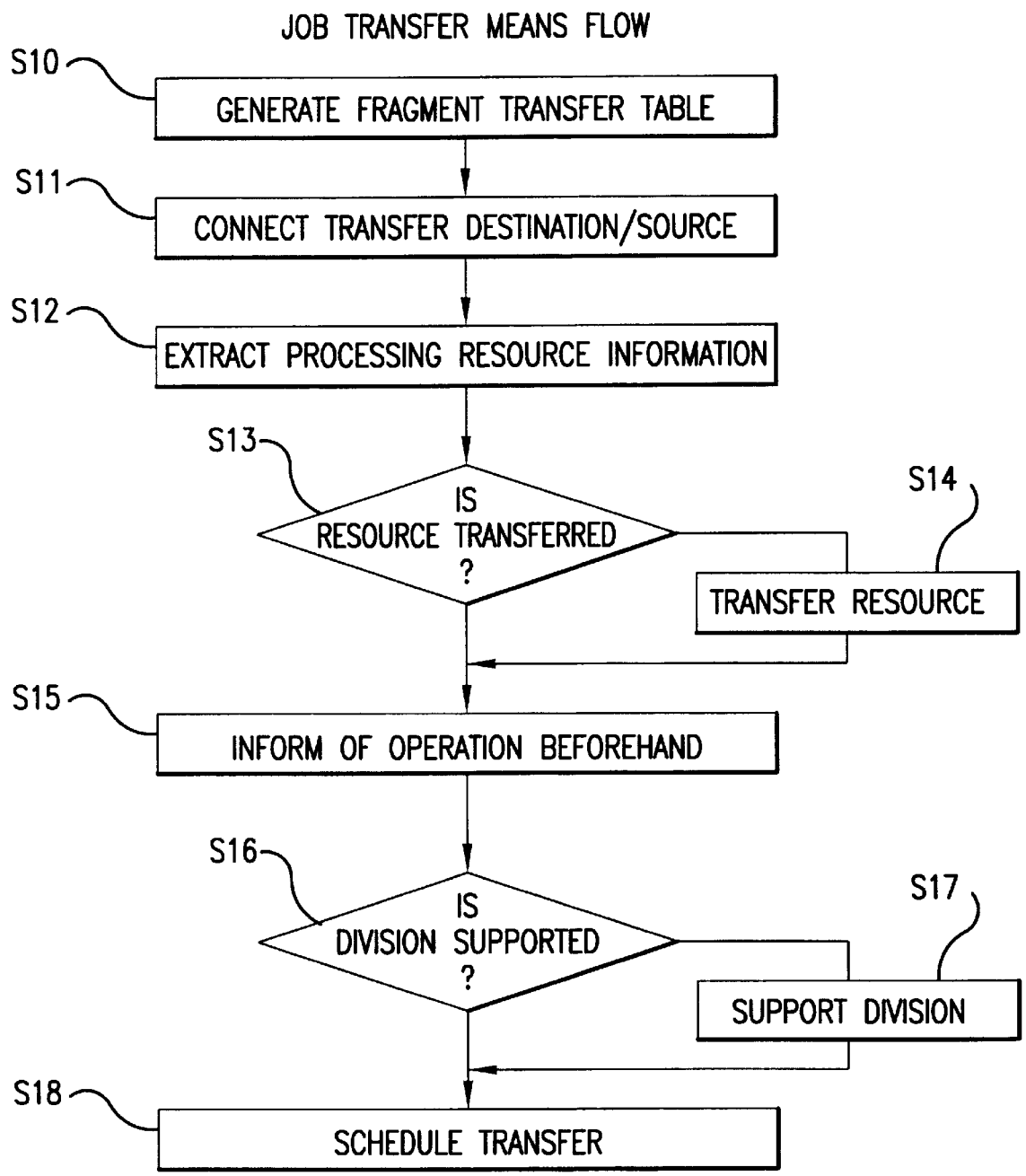
FIG. 7 is a flowchart for explaining the operation of printing job transfer means 10 in the above embodiment.
Figure 13:
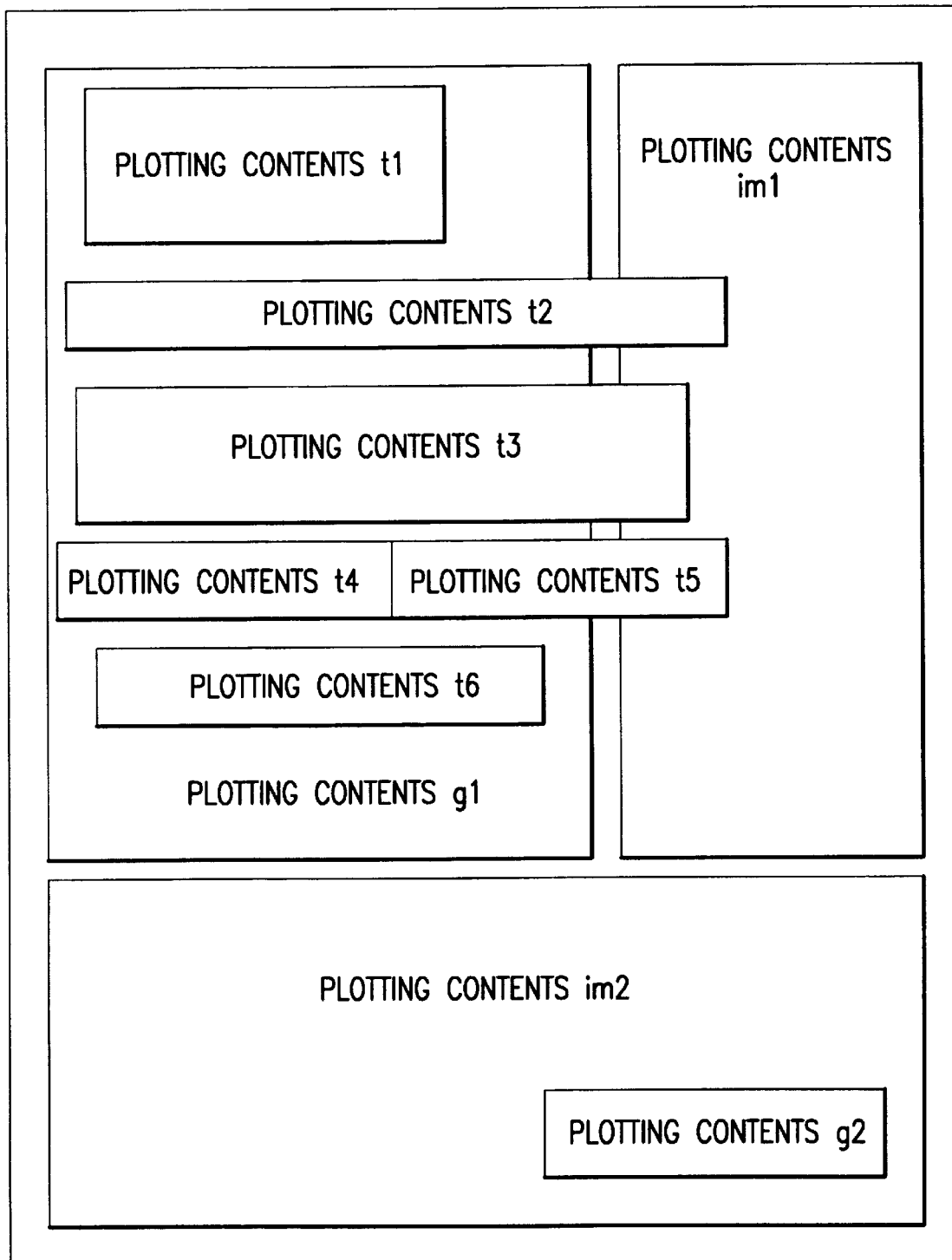
FIG. 13 explains the division of a printing job in the above embodiment.
Figure 14:
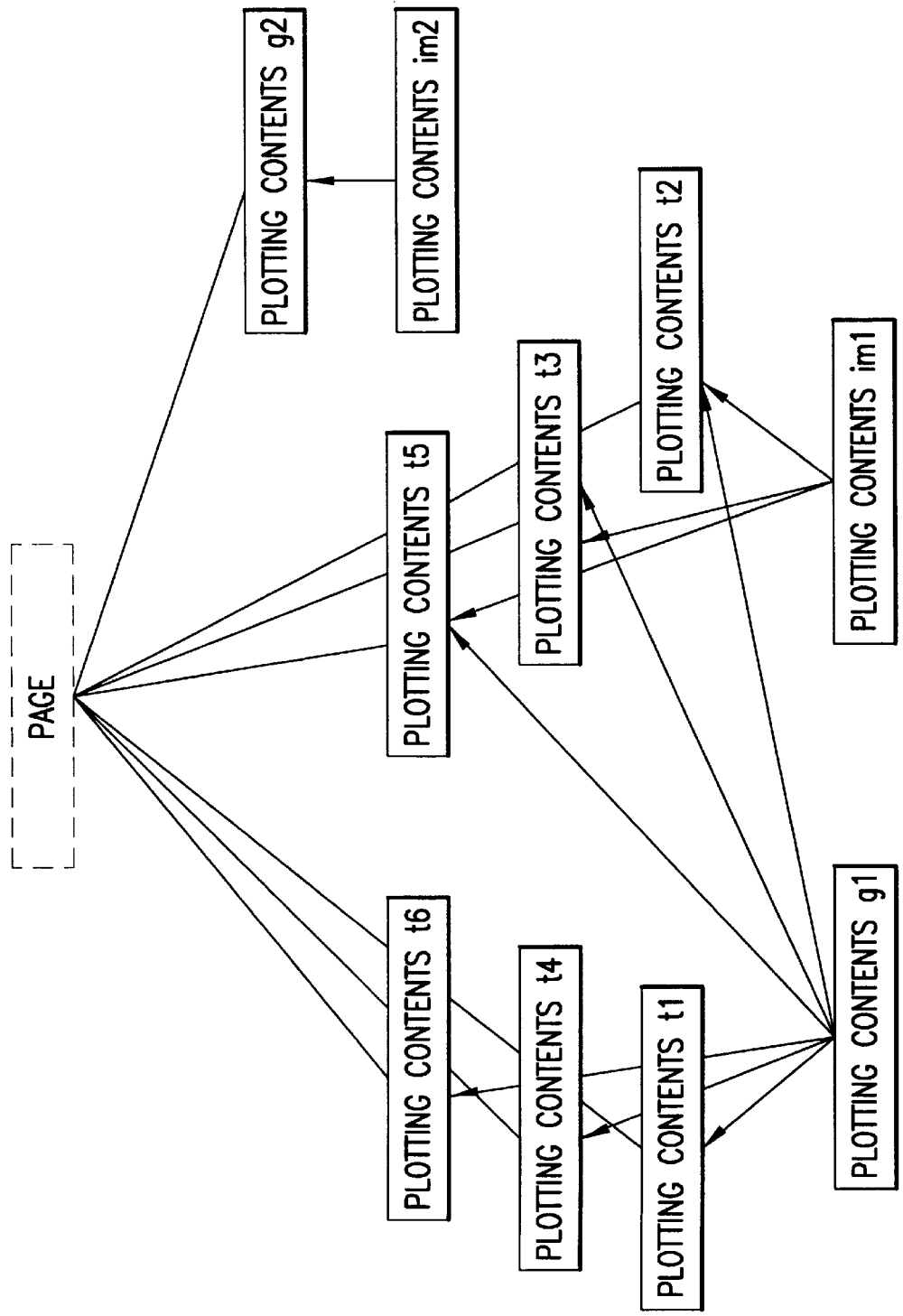
FIG. 14 explains the division of a printing job in the above embodiment.

FIGS. 7 to 11 explain operation for transferring a printing job. FIG. 7 shows the outline of a flow for transferring a printing job and as shown in FIG. 7, first, a transfer table is generated in S10. An example of the transfer table is shown in FIG. 18. This transfer table is generated as follows: First, as shown in FIGS. 13 and 14, a document is divided into plotting contents. The divided plotting contents become a divided printing job when they are provided with required resource information. A tag is allocated to respective fragments and an identifier, estimated processing time, a page number, required resources, a confirmation mode and others are described in the tag. The job manager 81 of the transfer control means 80 of the printing job transfer means 10 generates a transfer table based upon the above information.

In the meantime, there are two types of contents processed by the printing job division means 9. One is division processing in which the printing job division means 9 selects a processor 1 using resource information management means 8 and the file of the transfer processor and a processor 1 to which the file is transferred are connected. The other is division processing in which a file is divided and fragments are generated and it is connected by the transfer scheduling means 86 afterward by which processor 1 respective fragments are to be processed.

In the case of the former, the printing job division means 9 divides a printing job and the management center 15 determines by which processor each fragment is to be processed using registered information in the processor registration means 13 in which the information of each processor 1 is registered one by one in S11. The result is entered in the corresponding fragment tag. In this case, for processing for connection, a processor which is short of resource information is extracted by extracting processing resource information and the resource transfer instruction means retrieves a processor which has a short resource from registered information in S12 and S13. The resource transfer instruction means specifies a transfer destination for the found processor which has the resource using sending/receiving means 4 and instructs the processor to transfer the specified resource. The instructed processor transfers it using the sending/receiving means 4 in S14. When transfer is completed, the processor informs the resource transfer instruction means of the termination of transfer. Color processing depending upon a device, resolution enhancing processing and others are included in resources. A printer 2 is specified based upon registered information shown in FIG. 6 and required device processing information and resources are transferred to a processor 1 from the printer 2.

Figure 5:
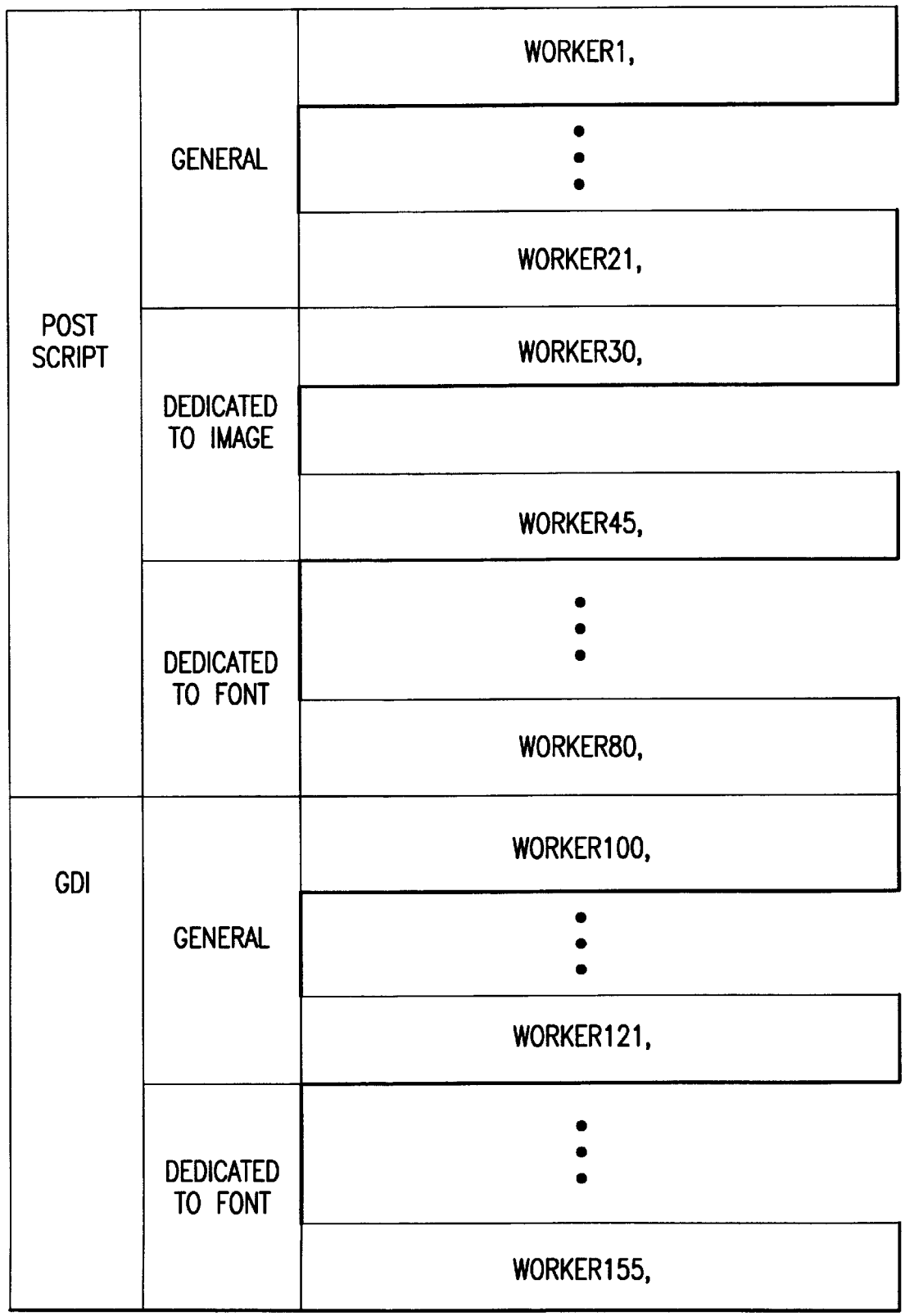
FIG. 5 shows an example of classification in which processors are classified based upon the contents of processing in the above embodiment.
Figure 15:
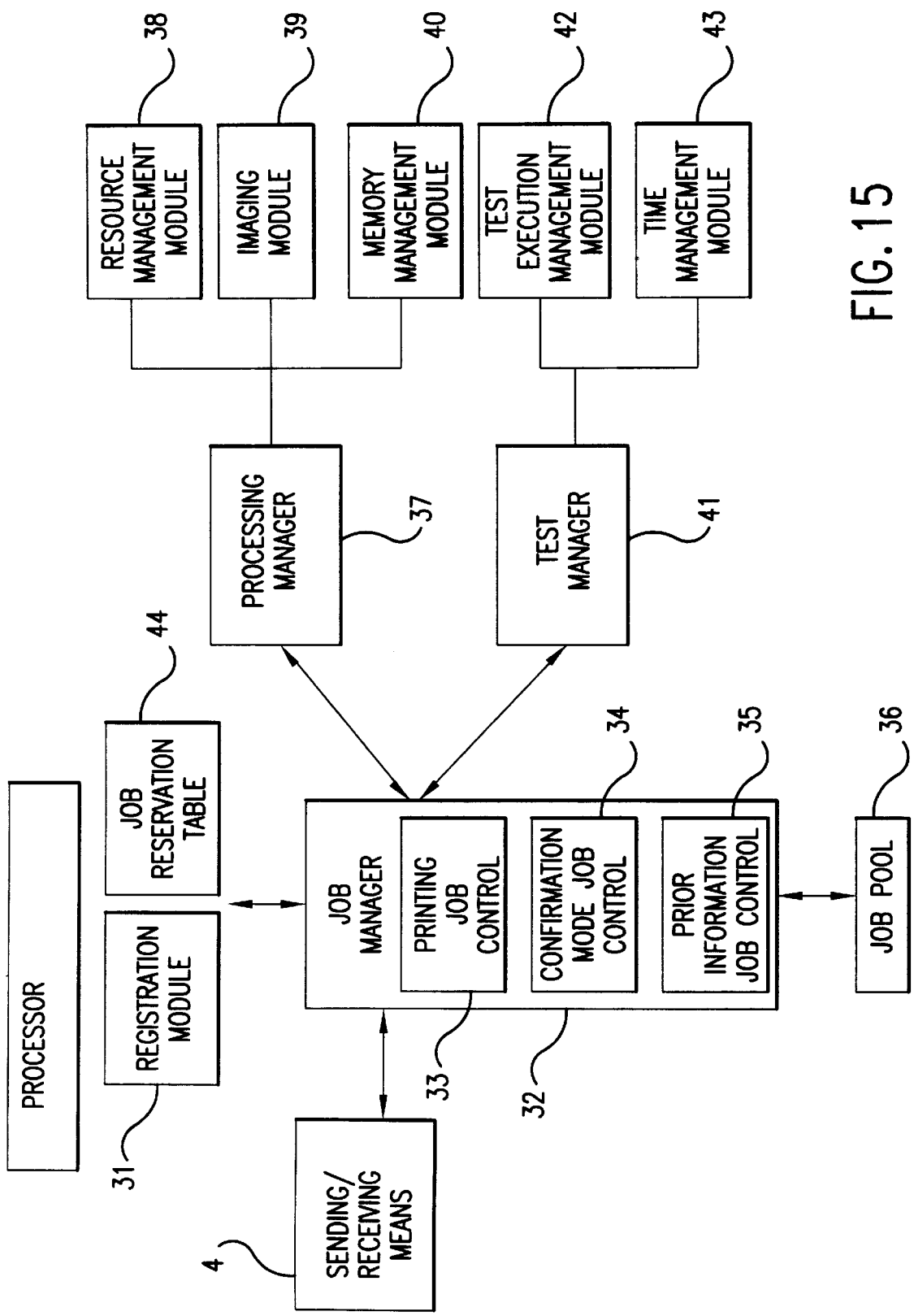
FIG. 15 is a block diagram showing the constitution of a processor 1 in the above embodiment.

Next, prior information processing is executed to a processor in S15. In a normal processor, a process constituted by various software for executing various jobs is activated, however, as it is not known until a fragment is sent what is included in the fragment which is a divided job, a process is normally inactive. As job transfer means 10 knows what processing is executed in each processor when a printing job is divided, transfer control means 80 instructs each processor to start required processing. If Worker 80 shown in FIG. 5 has an external character resource shown in FIG. 4 and a processor for processing an external character is further required, Worker 80 is instructed to transfer the external character resource to Worker 21, Worker 21 receives the external character resource from Worker 80 via a network and the number of processors which can process an external character can be increased by installing the external character resource in those processors. The transferred processor 1, the collector 16 and the printer 2 are informed beforehand. The contents of which the processor 1 informs beforehand will be described below. FIG. 15 shows the processor 1 and as shown in FIG. 15, a divided job is transferred to a job manager 32 via the sending/receiving means 4 and is held in a job pool 36. The job manager 32 is provided with printing job control means 33, confirmation mode job control means 34 and prior information job control means 35. The divided job is transferred to a processing manager 37 and executed. The processing manager 37 passes a resource to a resource management module 38 to let the resource management module manage it, lets an imaging module 39 execute image processing and further, lets a memory management module 40 manage a memory. A test manager 41, a test execution management module 42 and a time management module 43 are used for evaluating the processor's own resources. A registration processing module 31 and a job reservation table 44 are provided.

The contents of which the processor 1 informs beforehand are that the process of the imaging module 39 required for the processor 1 should be activated and a cache should be ready using a font set module. When the processor 1 receives a new resource using the sending/receiving means 4, it stores the new resource in the resource management module 38. Prior information is similarly received using the sending/receiving means 4 and is passed to prior information job control 35 in the job manager 32. The prior information job control 35 judges the informed contents, instructs a resource which is not ready to get ready, the processing manager 37 loads a required font set from the resource management module 38 into a memory, an outline font is developed and is stored in the resource management module 38 which functions as a cache, the whole imaging module 39 is activated and a process which is environment for running software is activated. Unnecessary data such as the prior result stored in the memory management module 40 is deleted.

In the meantime, in the case of the latter, that is, in case a file is divided until a fragment is created and it is connected by the transfer scheduling means 86 afterward by what processors 1 respective fragments are processed, first, connecting means 85 allocates the divided file to each processor 1. In a fragment tag, reference processing time estimated based upon the capability of the most general processor 1, required resources, where a divided file is stored are described. In the meantime, as the management center 15 regularly updates device status information, it is determined based upon the information where a divided file is allocated. For a method of allocating a divided file, there are a method of allocating to an unused processor successively, a method of allocating in the order of a page number, a method of allocating the first page preferential in the case of a large job which it takes time to print, a method of allocating by synchronizing two printers and a method of allocating for binding smoothly as postprocessing in which after all jobs are processed, they are printed. When a divided file is allocated and connecting a transfer source and a transfer destination is finished, subsequent processing is the same as in the case of the former.

As shown in FIG. 7, after the above prior information processing (S15), it is judged in S16 whether division support processing is required or not and if required, division support processing is executed in S17. Then, in step S18, schedule transfer takes place (this is described later with respect to FIG. 9). An item of division support is provided in a transfer table shown in FIG. 18 and if processing by division support means not shown in the client processor 1 is required, the divided file is rasterized beforehand. Some documents composed dispersively in a network consist of special files. A file composed by distribution may be small and may be processed more quickly when it is processed by the processor 1 in which the file is created than the processor 1 is selected. As shown in FIG. 10, a condition for determining whether support is required or not when a file is divided is set in S20. A case that support is required is, for example when the type of a file is not equivalent to the resource of the other processor 1 shown in FIG. 5 or when the size of a raster file is smaller than 100 kbytes. In case, for example a small photograph is inserted in a document, the photograph is converted by the processor 1 which is the body so that it has specified size and the color of it is corrected. An illustration drawn using CAD data is rasterized using the rasterizer of its CAD software. A rasterized file is transferred to the collector 16 in S21 and S22. If the division support means is not required, a printing job is divided, the divided printing job is transferred to the selected processor 1, is operated and further, collected in S23, S24 and S22.

Figure 10:
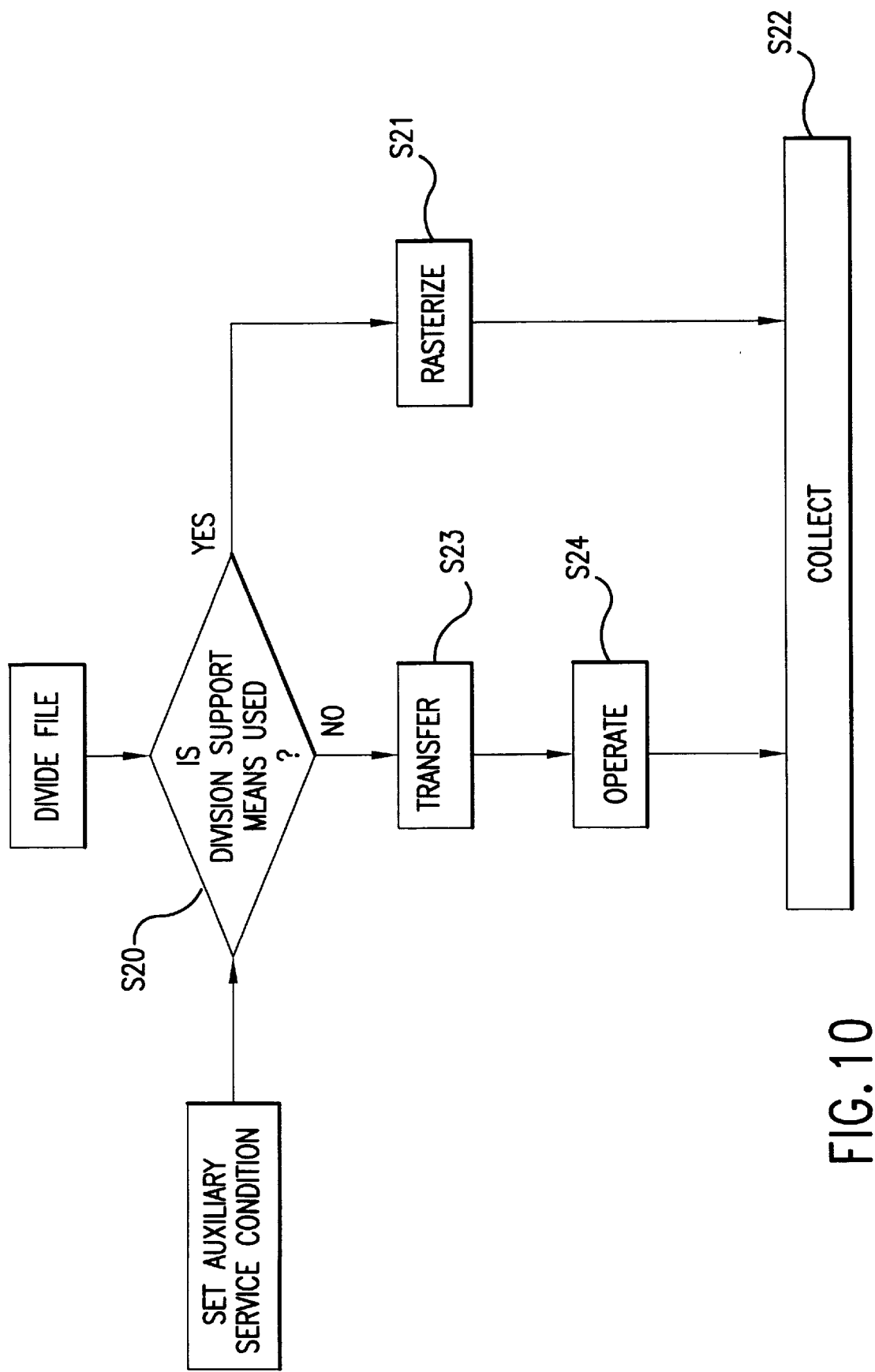
FIG. 10 is a flowchart for explaining operation by division support in the above embodiment.
Figure 11:
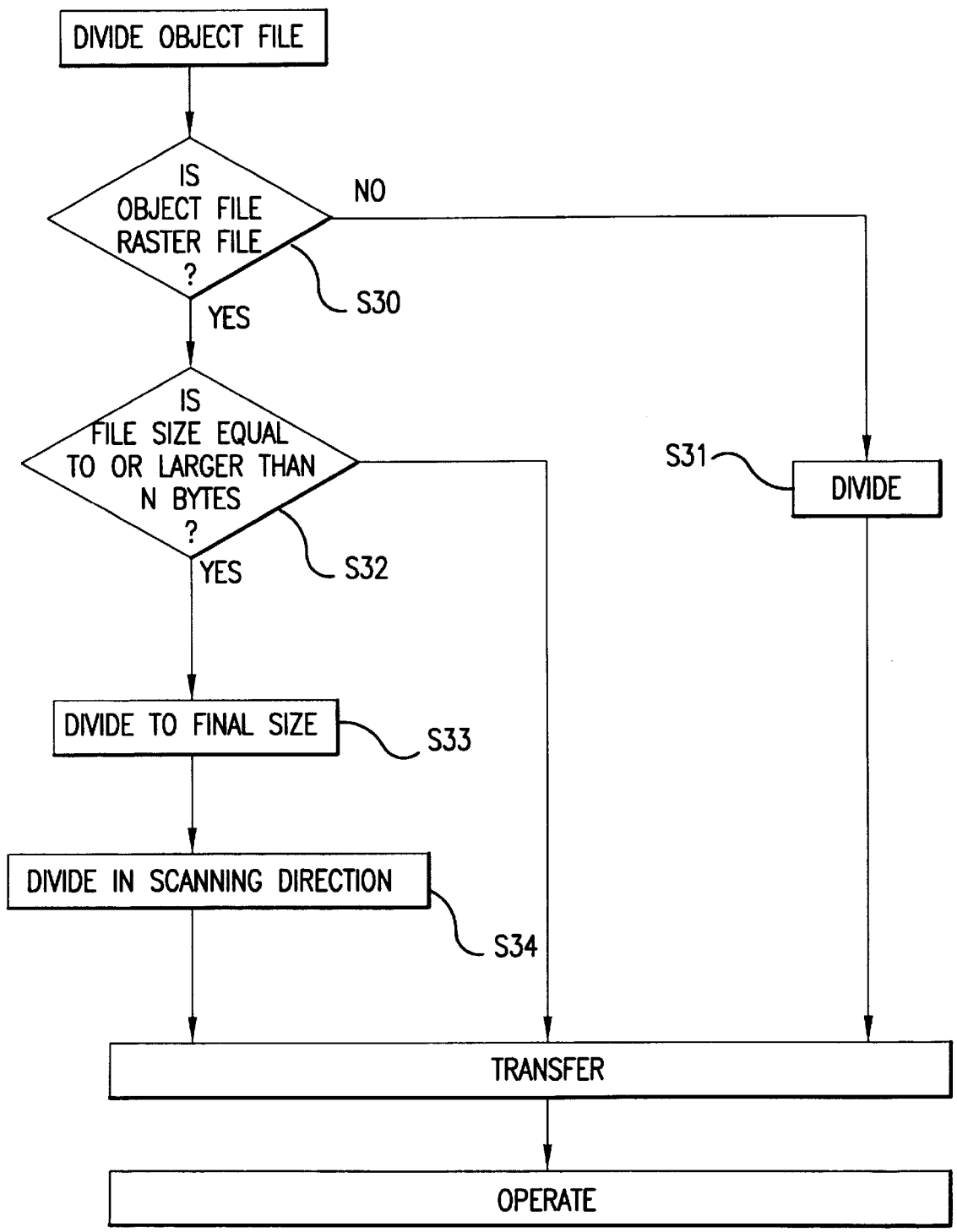
FIG. 11 is a flowchart for explaining raster division support operation in the above embodiment.

FIG. 11 shows processing when a raster file, for example the raster file generated as shown in FIG. 10 is divided. If a raster file is processed, the size hinders processing and division as it is is difficult. It is desirable that when one raster file is 5 Mbytes or more in a network in the class of 100 Mbits per second (bps) though it also depends upon the rate of a network and the number of processors included in it, the division support means is used. The size and direction are determined based upon the resolution of the printer 2 and if mask information exists, the division support means instructs the rasterization means 5, 5', 5" to rasterize it. As a writing scanning direction in printing is determined based upon the output direction of the printer 2, a file processed in the direction is divided. It is divided into two or more depending upon the size and transferred.

Figure 12:
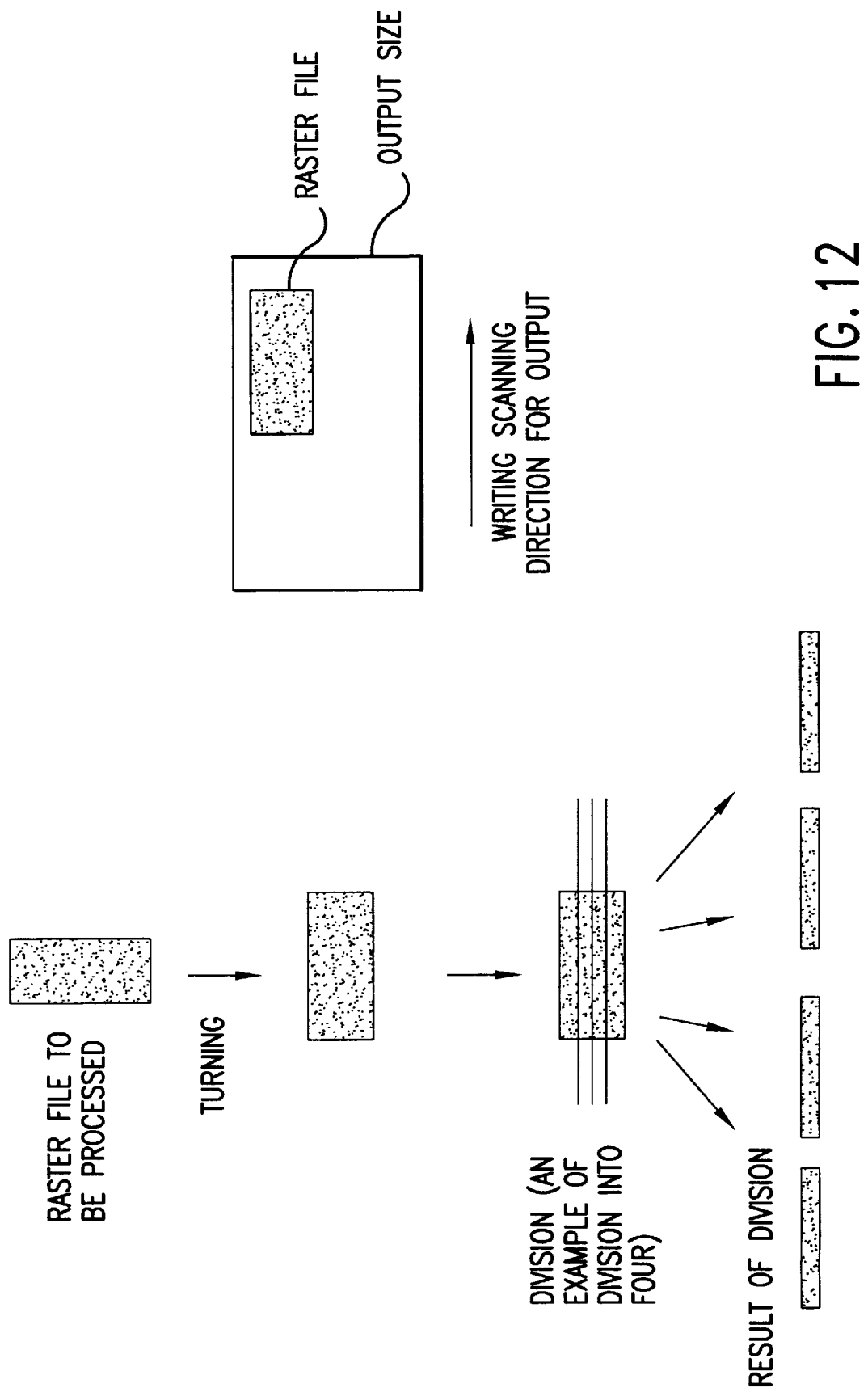
FIG. 12 explains the operation shown in FIG. 11.

That is, as shown in FIG. 11, first, it is judged in S30 whether a file to be divided is a raster file or not and if the file is not a raster file, it is divided as it is in S31. If the size of a raster file is smaller than N bytes (for example, 5 Mbytes), it is transferred without being divided in S32. If the size is larger than N bytes, the file is divided in the scanning direction and transferred in S33 and S34 after the file is converted so that it is a final form. FIG. 12 shows an example of division processing in the steps S33 and S34.

The divided file is transferred to each processor 1 and processing proper to a raster is executed, for example the divided file is passed through a digital filter and others and is synthesized by the collector 16. If a line aligned in synthesis may be visible depending upon the processing contents of a filter, image processing for suitably processing the aligned line of the divided file is also included. When division support processing is finished, the control means 89 of the transfer scheduling means 86 starts transfer according to the order described in a transfer table.

Figure 8:
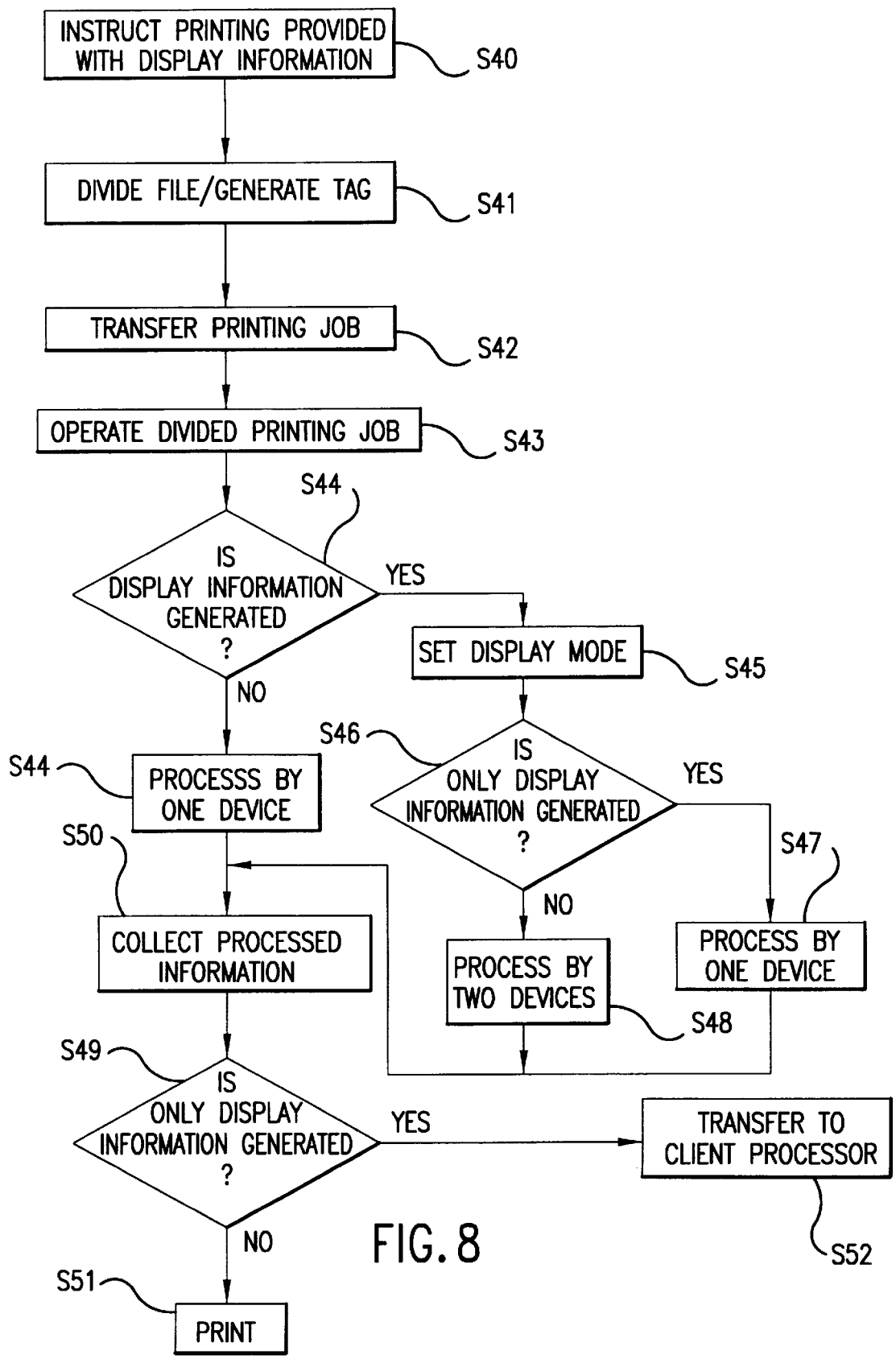
FIG. 8 is a flowchart for explaining operation in a confirmation mode in the above embodiment.

FIG. 8 shows processing in which print contents can be checked by the client processor 1. As shown in FIG. 8, when a confirmation mode is selected using printing instruction means 17 and the confirmation mode provided with information for confirmation is specified in S40, confirmation mode setting means 90 shown in FIG. 3 writes that the confirmation mode is specified and device information to a tag generated for the divided file in S41.

The specification of the confirmation mode includes a complete level and a layout level and there are the complete level at which any printed information is visible and the layout level at which the size of a character and the layout of a photograph and a character are visible though character information is substituted by other symbols. Information such as 72 spi which is the resolution of a general display, the number of colors of a display of sixteen million and color representation $L*a*b*$ is written to the tag in addition to them.

A divided printing job is transferred to the processor 1 and processed in S42 and S43. It is judged based upon the tag whether display information is generated or not and if the confirmation mode is set, the divided printing job is processed according to the mode in S44 and S45. There are a case that only display information is generated and a case that print information is generated in addition to display information in S46, S47 and S48. The processed information is transferred to the collector 16 and only display information is transferred from the collector 16 to the client processor 1 in S49, S51 and S52.

Figure 17:
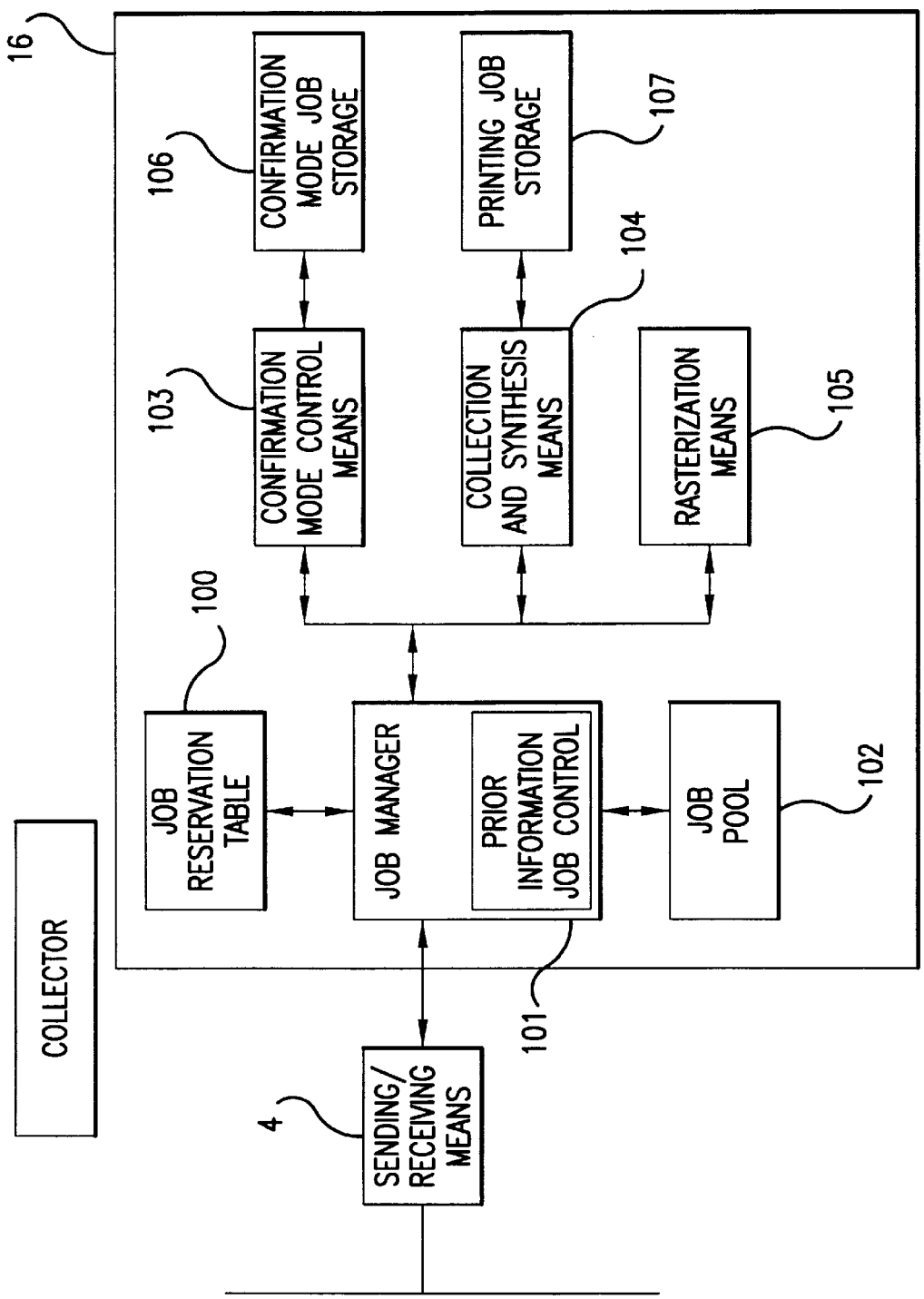
FIG. 17 is a block diagram showing the constitution of a collector 16 in the above embodiment.

FIG. 17 shows the collector 16. The specification of a confirmation mode is sent to a job manager 101 and a printing job related to confirmation mode control means 103 is processed. The confirmation mode control means 103 generates display information for confirmation and stores it in a confirmation mode job storage 106. The job manager 101 sends the generated display information to the client processor 1 using the sending/receiving means 4. In FIG. 17, a reference number 100 denotes a job reservation table, 102 denotes a job pool, 104 denotes collection synthesis means and 105 denotes rasterization means.

There are some types of display information. There are a method of compressing a file in accordance with a raster which is suitable for a display according to the information of the display and sending it to the client processor 1 and also a method of sending it in intermediate format representation not directly related to a display to the client processor 1.

Figure 2:
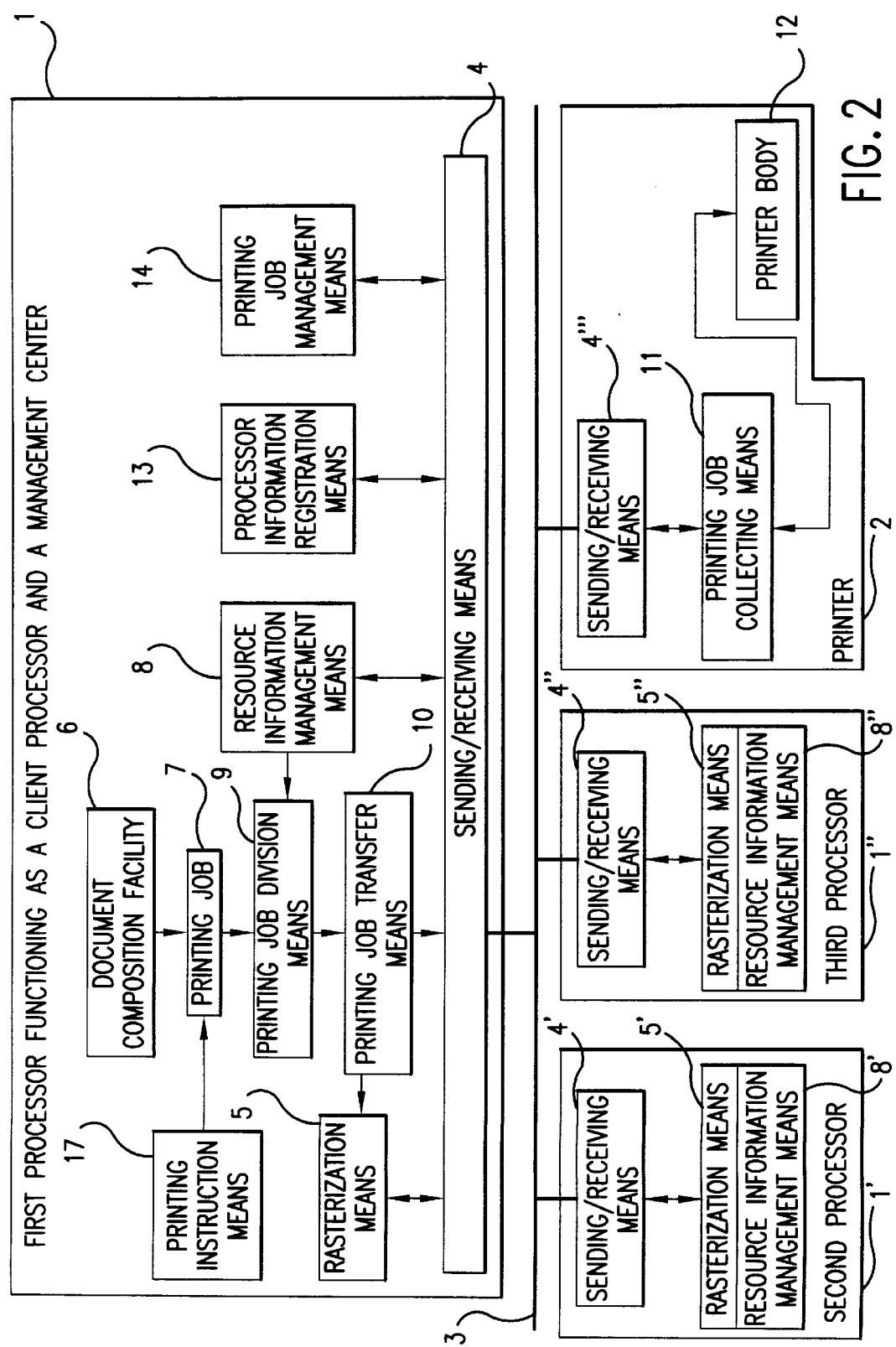
FIG. 2 is a block diagram showing a transformed example of the above embodiment.

A user checks the result of the processing of a printing job using the display of the client processor 1. When "ok" is entered in the client processor 1 if the result is satisfactory, it is transmitted to the collector 16 linked to the file via the sending/receiving means 4, the print information temporarily stored in the printing job storage 107 shown in FIG. 17 is transferred to the printer 2 via the job manager 101 shown in FIG. 17 and printed. In a system including the collecting means 11 and the printer 12 as shown in FIG. 2, print information is directly printed. In a mechanism such as Microsoft object linking and embedding (OLE) and Apple computer OpenDoc, a method of lining is realized.

If correction is required, corrected information is entered without entering "ok". At that time, the job manager 101 stores the printing job as it is. The part to be altered of the divided file is extracted from the storage written in the fragment tag, only the part is transferred to the processor 1 again and corrected print information can be printed by replacing the part by the collector 16.

Figure 9:
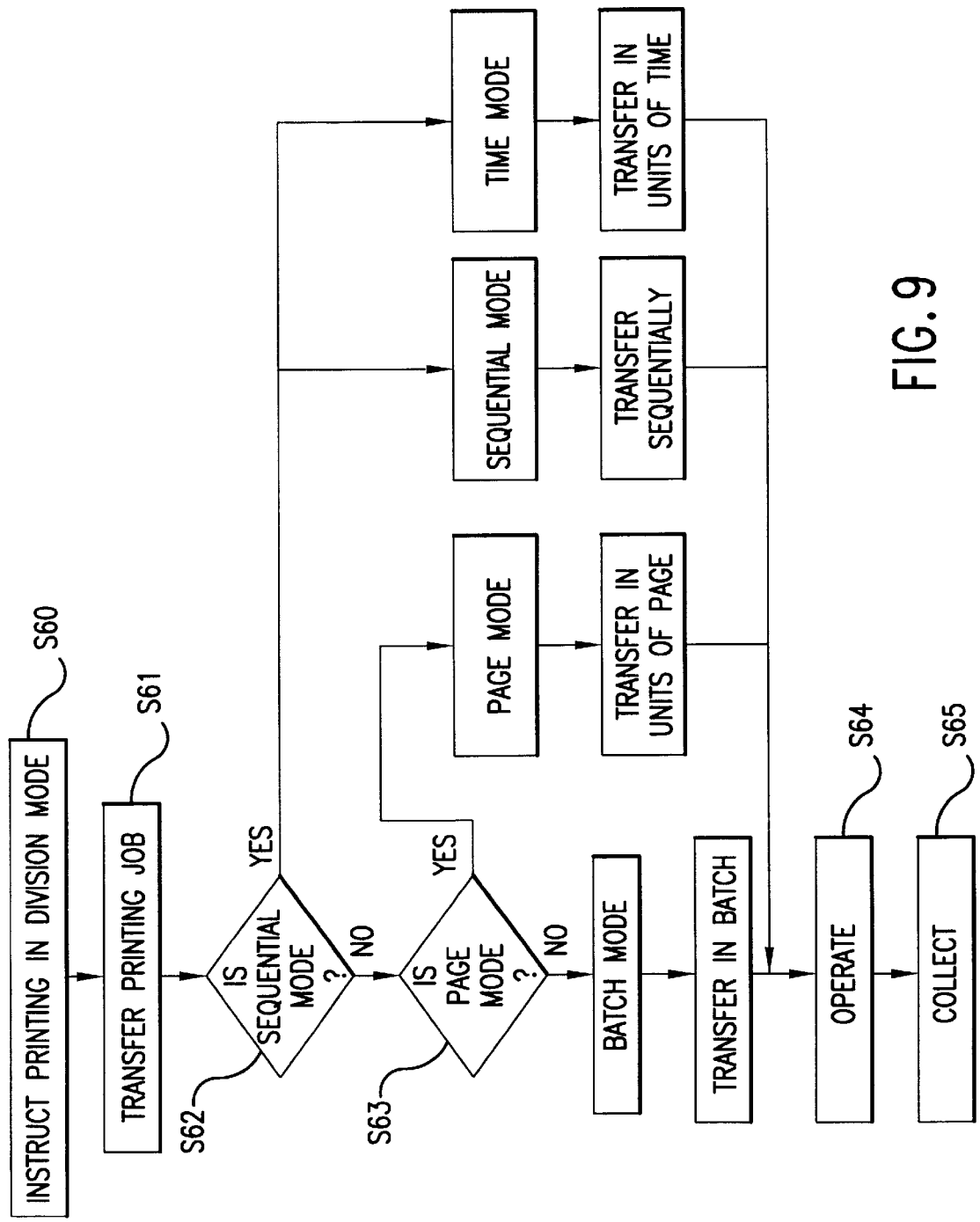
FIG. 9 is a flowchart for explaining operation in a division mode in the above embodiment.

FIG. 9 shows a flow of division and transfer. The priority of the processing of a printing job is specified by printing instruction means 17 and transfer is executed according to this in S60 and S61. As the size of the printing job is known beforehand, the transfer scheduling control means determines a mode based upon the size and the priority in S62 and S63. The printing job is transferred to the processor 1, operated and collected according to this mode in S64 and S65, and printing is executed based upon the collected data.

A file including small pages is processed in a sequential mode, a file of high priority is processed in a page mode and a file of low priority is processed in a batch mode. As a mode is varied depending upon the constitution of a system and the contents of a printing job, a mode may be also specified directly by the printing instruction means. In the sequential mode, a divided file is successively transferred to a selected processor 1. In the page mode, a divided file in units of page is transferred to a selected processor 1. In this case, synchronization in units of page in collecting can be readily obtained. In the batch mode, a printing job is divided collectively, transferred to the processor 1 and processed and the method is useful in processing such as sorting after printing.

A time mode is a method of transferring in fixed time in case a job is large.

The transfer scheduling control means 89 does not necessarily process one job in one mode. If a job is large, a mixed mode in which a first page is processed in a page mode and the residual pages are processed in a sequential mode is provided.

According to this embodiment, the following effect can be obtained:

As described above, in a printing system for rasterizing a source file in which a printing job is described to obtain picture element information for printing by plural processors 1 roughly connected via a network, a job divided by printing job division means 9 can be transferred and processed by a processor 1 owing to printing job transfer means 10 and means for collecting the result and transferring to a printer 2 and for a user to check the result of the processing of the printing job on the client processor prior to being transferred to the printer 2 can be provided.

Processing resource information extracting means 82 defines a processor 1 which has no required printing processing resource by extracting resources required for processing in view of the contents of a divided job when the job is divided and a processor which cannot be heretofore used can be generally used and a printing job can be efficiently divided by transferring such a resource to the processor.

A received divided file can be connected to an optimum processor owing to transfer destination/source connecting means 85. If a processor to which a divided printing job is transferred has no resource, the connecting means instructs resource transfer instruction means 83 to enable the above connection.

Normally, after a job is received, the contents of processing are judged and required preparation is started, however, the processing of the transferred divided job and the collection can be started without large time lag because processing prior information means 84 informs each processor prior to transfer.

Special rasterization and a large raster image such as a photograph can be efficiently processed as a divided file by providing rasterization means prior to being divided and transferred to the processor 1 by division support means 88.

Division and transfer can be efficiently executed by setting a transfer mode according to the contents of a printing job and an instruction by transfer scheduling control means 89.

Figure 16:
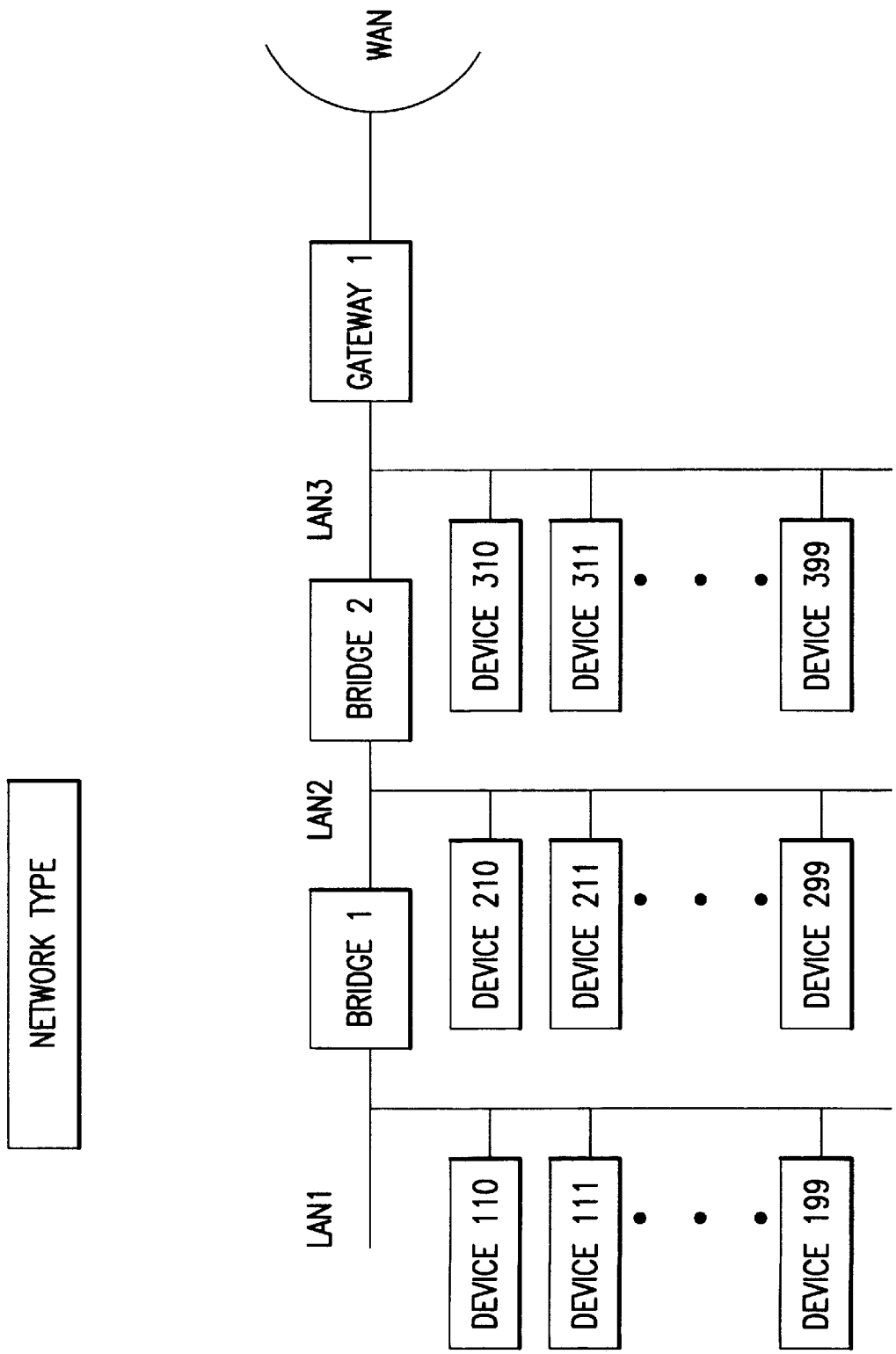
FIG. 16 shows an example of the type of a network to which the above embodiment can be applied.

In a network system, there is a case that a processor 1, a client processor and a printer 2 are distant as shown in FIG. 16. Particularly, if the creator of a document directly hands the print to another person, confirmation is required, however, an error in the case of printing via a network is reduced and a user can use the printing system without anxiety because the result of processing can be checked on the display of a client processor when a confirmation mode is set.

The present invention is not limited to the above embodiment and various variations are allowed. For example, as shown in FIG. 2, a client processor 1 also functions as a management center 15. A collector 16 and a printer 2 may be integrated. In FIG. 2, the corresponding reference number is allocated to the corresponding location to the one in FIG. 1 and detailed description is omitted.

As described above, according to the present invention, when a divided printing job is transferred to each processor, it is informed each processor beforehand and time for required preparation is given. Therefore, when the divided printing job is actually transferred, each processor can immediately start processing. As a resource required by a transfer destination is already known when a printing job is divided and transferred, this is transferred and a printing job can be processed in parallel by more processors.

What is claimed is:

1. A printing system that executes rasterization to obtain picture element information for printing based upon a source file in which a printing job is described, the printing system having plural processors roughly connected via a network, comprising:

means for extracting resource information required to execute rasterization of said printing job;

means for dividing said printing job;

means for connecting a transfer source to transfer destinations of said divided printing job;

the transfer source having prior information means for informing said transfer destinations of preparation processing prior to transfer of said divided printing job so that said transfer destinations execute preparation processing for said divided printing job; and transfer scheduling means for determining the transfer schedule of said divided printing job.

2. A printing system according to claim 1, further comprising:

means for transferring resource information required for rasterizing said divided printing job to a processor to which said divided printing job is allocated when said processor does not have said resource information.

3. A printing system according to claim 2, wherein:

said resource is any of an external character, a processing software module and a specific parameter required for processing.

4. A printing system according to claim 1, wherein:

said prior information means informs at least one of a printer for executing said printing job and a collector for collecting said rasterized information of preparation processing.

5. A printing system according to claim 1, wherein said transfer scheduling means includes confirmation mode setting means for instructing that the printing job be returned to a processor that issued the printing job after rasterization; and further comprising a collector for collecting rasterized information, said collector provided with means for generating information for display based upon said printing job and returning said collected rasterized information to the processor which issued said printing job.

6. A printing system according to claim 1, wherein:

said transfer scheduling means selects at least one of plural transfer modes including a sequential mode for successively transferring a divided printing job part, a page mode for transferring a page on which division is finished in units of page, a batch mode for collectively transferring said printing job part in units of printing job and a time mode for transferring at specified time according to at least the priority of said printing job and transfers said printing job part in the selected transfer mode.

7. A printing system according to claim 1, wherein:

when a rasterized object meets a predetermined condition, rasterization is executed by a processor in which said printing job is generated.

8. A printing system according to claim 7, wherein:

when the size of a generated raster image is judged to be larger than a fixed size, said raster image is beforehand processed by rasterization means so that said raster image is the form and size of a final output image and afterward is divided.

9. A printing system according to claim 1, wherein said transfer scheduling means selects at least one of a plurality of available transfer modes by which to transfer said divided printing job.

10. A printing method for executing rasterization to obtain picture element information for printing based upon a source file in which a printing job is described, said method using plural processors roughly connected via a network, comprising the steps of:

extracting resource information required to execute rasterization of said printing job;

dividing said printing job;

connecting a transfer source to transfer destinations of said divided printing job;

the transfer source informing said transfer destinations of preparation processing prior to transfer of said divided printing job so that said transfer destinations execute preparation processing for said divided printing job; and determining the transfer schedule of said divided printing job.

11. A printing method according to claim 10, wherein said transfer schedule is determined by selecting at least one of a plurality of available transfer modes by which to transfer said divided printing job.

12. A printing method according to claim 10, wherein:

said transfer schedule is determined by selecting at least one of plural transfer modes including a sequential mode for successively transferring a divided printing job part, a page mode for transferring a page on which division is finished in units of page, a batch mode for collectively transferring said printing job part in units of printing job, and a time mode for transferring at specified time according to at least the priority of said printing job, and said printing job part is transferred in the selected transfer mode.

13. A printing system that executes rasterization to obtain picture element information for printing based upon a source file in which a printing job is described, the printing system having plural operation means roughly connected via a network, comprising:

means for extracting resource information required to execute rasterization of said printing job;

means for dividing said printing job;

means for determining which of said plural operation means are to be destinations to which said divided printing job is to be transferred for rasterization according to the result of extraction by said resource information extracting means;

prior information means for informing said destinations of preparation processing prior to the transfer of said divided printing job so that said operation means at said destinations execute preparation processing for said divided printing job; and transfer scheduling means for determining the transfer schedule of said divided printing job.

14. A printing system according to claim 13, wherein:

said transfer scheduling means specifies printing means for printing picture element information for printing which is operated by said operation means.

15. A printing system according to claim 13, wherein said transfer scheduling means selects at least one of a plurality of available transfer modes by which to transfer said divided printing job.

16. A printing system according to claim 10, wherein:

said transfer scheduling means selects at least one of plural transfer modes including a sequential mode for successively transferring a divided printing job part, a page mode for transferring a page on which division is finished in units of page, a batch mode for collectively transferring said printing job part in units of printing job, and a time mode for transferring at specified time according to at least the priority of said printing job, and transfers said printing job part in the selected transfer mode.

17. A printing system that executes rasterization to obtain picture element information for printing based upon a source file in which a printing job is described, said printing system having plural operation means roughly connected via a network, comprising:

means for extracting resource information required to execute rasterization of said printing job;

means for dividing said printing job;

means for determining which of said plural operation means are to be destinations to which said divided printing job is transferred;

means for transferring resource information required for the transferred printing job to said operation means at the destination of said divided printing job based upon the result of extraction by said resource information extracting means; and transfer scheduling means for determining the transfer schedule of said divided printing job.

18. A printing system according to claim 17, wherein:

said transfer scheduling means specifies printing means for printing picture element information for printing which is operated by said operation means.

19. A printing system according to claim 17, wherein:

said resource transfer means at least comprises means for registering said operation means and managed and registered information holding means for describing the result extracted by said resource information extracting means every registered said operation means.

20. A printing system according to claim 17, wherein said transfer scheduling means selects at least one of a plurality of available transfer modes by which to transfer said divided printing job.

21. A printing system according to claim 17, wherein:

said transfer scheduling means selects at least one of plural transfer modes including a sequential mode for successively transferring a divided printing job part, a page mode for transferring a page on which division is finished in units of page, a batch mode for collectively transferring said printing job part in units of printing job, and a time mode for transferring at specified time according to at least the priority of said printing job, and transfers said printing job part in the selected transfer mode.

* * * * *